US010378472B2

(12) United States Patent
Dudar et al.

(10) Patent No.: US 10,378,472 B2
(45) Date of Patent: Aug. 13, 2019

(54) HYDROCARBON SENSOR DIAGNOSTIC

(71) Applicant: Ford Global Technologies, LLC, Dearborn, MI (US)

(72) Inventors: Aed M. Dudar, Canton, MI (US); Douglas Raymond Martin, Canton, MI (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

(21) Appl. No.: 15/435,741

(22) Filed: Feb. 17, 2017

(65) Prior Publication Data

US 2018/0238261 A1    Aug. 23, 2018

(51) Int. Cl.
| | | |
|---|---|---|
| *F02D 41/00* | (2006.01) |
| *F02D 41/22* | (2006.01) |
| *F02D 41/30* | (2006.01) |
| *F02D 41/06* | (2006.01) |
| *F02M 35/10* | (2006.01) |
| *F02D 41/14* | (2006.01) |

(52) U.S. Cl.
CPC ....... *F02D 41/222* (2013.01); *F02D 41/0055* (2013.01); *F02D 41/0077* (2013.01); *F02D 41/062* (2013.01); *F02D 41/144* (2013.01); *F02D 41/3005* (2013.01); *F02M 35/10393* (2013.01); *F02D 41/1459* (2013.01); *F02D 2200/021* (2013.01); *F02D 2200/04* (2013.01); *F02D 2200/0414* (2013.01)

(58) Field of Classification Search
CPC .... F02D 41/222; F02D 41/26; F02D 41/3005; F02D 2200/021; F02D 2200/0414; F02D 41/0077; F02D 41/062; F02M 35/10393
See application file for complete search history.

(56) References Cited

U.S. PATENT DOCUMENTS

| | | | | |
|---|---|---|---|---|
| 5,889,196 A | * | 3/1999 | Ueno | ............... G01N 27/407 |
| | | | | 204/429 |
| 5,898,107 A | * | 4/1999 | Schenk | ............... G01N 33/007 |
| | | | | 73/114.71 |
| 6,034,610 A | * | 3/2000 | Schnaibel | ............... F02B 39/16 |
| | | | | 123/679 |

(Continued)

FOREIGN PATENT DOCUMENTS

| | | |
|---|---|---|
| DE | 102012205017 A1 | 10/2012 |
| DE | 102012221551 A1 | 5/2014 |
| JP | 2006322339 A | 11/2006 |

OTHER PUBLICATIONS

GB Search Report dated Aug. 3, 2018 re GB Appl. No. 1802474.5.

*Primary Examiner* — Hieu T Vo
*Assistant Examiner* — Sherman D Manley
(74) *Attorney, Agent, or Firm* — Frank A. MacKenzie; Bejin Bieneman PLC

(57) ABSTRACT

A hydrocarbon sensor diagnosis system includes a computer programmed to collect data from a hydrocarbon sensor while an exhaust gas recirculation system is in an open state. The hydrocarbon sensor is mounted along an engine air intake between an exhaust port of the exhaust gas recirculation system and an intake port of a cylinder head. The computer is further programmed to determine whether a hydrocarbon sensor fault exists based at least on the collected data.

19 Claims, 3 Drawing Sheets

(56) References Cited

U.S. PATENT DOCUMENTS

| | | | |
|---|---|---|---|
| 6,415,776 B1* | 7/2002 | Gates | F02D 41/0072 |
| | | | 123/568.24 |
| 7,934,420 B2* | 5/2011 | Kama | F02D 41/1441 |
| | | | 73/114.69 |
| 8,196,568 B2 | 6/2012 | Springer et al. | |
| 9,328,684 B2 | 5/2016 | Surnilla et al. | |
| 9,719,389 B2* | 8/2017 | Grewal | F01N 3/2006 |
| 2003/0082824 A1* | 5/2003 | Dumas | F02M 25/0854 |
| | | | 436/139 |
| 2010/0262356 A1* | 10/2010 | Maruyama | B60K 6/365 |
| | | | 701/103 |
| 2011/0174276 A1 | 7/2011 | Bierl et al. | |
| 2011/0289999 A1 | 12/2011 | Bierl et al. | |
| 2014/0144416 A1 | 5/2014 | Heinrich et al. | |
| 2014/0277998 A1* | 9/2014 | Martin | B60W 20/50 |
| | | | 701/102 |
| 2015/0047340 A1* | 2/2015 | Ulrey | F02B 47/08 |
| | | | 60/600 |
| 2015/0083093 A1* | 3/2015 | Desai | F02D 41/064 |
| | | | 123/556 |
| 2015/0128907 A1* | 5/2015 | Redon | F02B 75/12 |
| | | | 123/46 R |
| 2018/0023497 A1 | 1/2018 | Dudar | |

* cited by examiner

HYDROCARBON SENSOR DIAGNOSTIC

BACKGROUND

Internal combustion engines utilize a variety of sensors to monitor various operational elements of the engine, which is used to control the engine to operate cleanly and efficiently. For example, engines may utilize sensors to detect gaseous hydrocarbons, oxygen, nitrous oxides, etc., flowing through various engine components. Certain of the sensors, and/or the data sensed by these sensors, may be required by various governmental regulation. The regulations may additionally require that the sensors be diagnosed for operability.

DETAILED DESCRIPTION

Figure 1A:
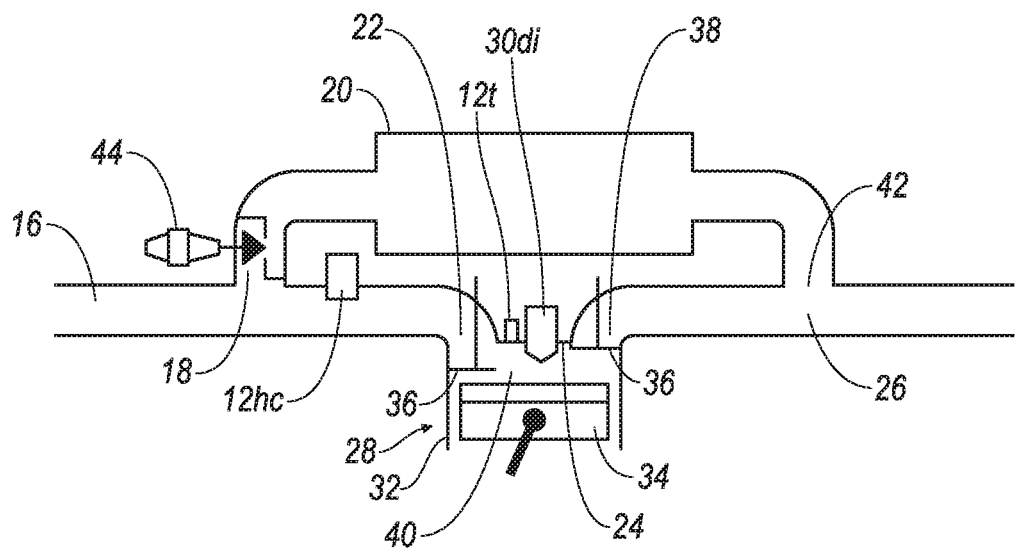
FIG. 1A is a schematic of an example direct injected engine with an exhaust gas recirculation system.

Disclosed herein is a system comprising a computer programmed to collect data from a hydrocarbon sensor mounted along an engine air intake between an exhaust port of an exhaust gas recirculation system and an intake port of a cylinder head while the exhaust gas recirculation system is in an open state, and to determine whether a hydrocarbon sensor fault exists based at least on the collected data. The determination of whether the hydrocarbon sensor fault exists may be based at least on an ambient air temperature. The determination of whether the hydrocarbon sensor fault exists may be based at least on a temperature of the cylinder head. The collection of data from the hydrocarbon sensor may be performed while actuating a fuel injector mounted on the engine air intake before starting an engine mounted to the engine air intake.

The computer may be further programmed to collect the data from the hydrocarbon sensor within a predetermined time of starting an engine mounted to the engine air intake. The computer may be further programmed to collect the data from the hydrocarbon sensor within twenty seconds of starting the engine mounted to the engine air intake. The computer may be further programmed to actuate an exhaust gas recirculation valve to an open position upon starting the engine mounted to the engine air intake. The computer may be further programmed to store a fault code in response to determining that the hydrocarbon sensor fault exists. The computer may be further programmed to transmit a no fault code in response to determining that no hydrocarbon sensor fault exists. The computer may be further programmed to transmit a fault code in response to determining that the hydrocarbon sensor fault exists.

Also disclosed herein is a method comprising collecting data from a hydrocarbon sensor mounted along an engine air intake between an exhaust port of an exhaust gas recirculation system and an intake port of a cylinder head while the exhaust gas recirculation system is in an open state, and determining whether a hydrocarbon sensor fault exists based at least on the collected data. The determination may be based at least on an ambient air temperature. The determination may be based at least on a temperature of the cylinder head The method may further comprise collecting the data from the hydrocarbon sensor within a predetermined time of starting an engine mounted to the engine air intake. The method may further comprise collecting the data from the hydrocarbon sensor within twenty seconds of starting the engine mounted to the engine air intake. The method may further comprise actuating an exhaust gas recirculation valve to an open position upon starting the engine mounted to the engine air intake. The method may further comprise storing a fault code in response to determining that the hydrocarbon sensor fault exists. The method may further comprise collecting the data from the hydrocarbon sensor while actuating a fuel injector mounted on the engine air intake before starting the engine mounted to the engine air intake. The method may further comprising transmitting a no fault code in response to determining that no hydrocarbon sensor fault exists. The method may further comprise transmitting a fault code in response to determining that the hydrocarbon sensor fault exists.

With reference to the Figures, wherein like numerals indicate like parts throughout the several views a system 10 for a vehicle (not shown) to diagnoses a vehicle sensor 12 includes a computer 14 programmed to collect data from a hydrocarbon sensor 12$hc$ while an exhaust gas recirculation system 20 is in an open state. The hydrocarbon sensor 12$hc$ is mounted along an engine air intake 16 between the exhaust port 18 of an exhaust gas recirculation system 20 and an intake port 22 of a cylinder head 24. The computer 14 determines whether a hydrocarbon sensor fault exists based at least on the collected data.

The system 10 provides a flow of gases having an anticipated hydrocarbon content, e.g., based on various factors discussed below, that are used when diagnosing the hydrocarbon sensor 12$hc$, e.g., to determine whether output from the hydrocarbon sensor 12$hc$ is rational.

Although collecting data while the exhaust gas recirculation system 20 is in the open state is applicable to autonomous and non-autonomous vehicles, it may be particularly beneficial to an autonomous vehicle without an occupant, as exhaust gas recirculation may be perceived as unpleasant by an occupant, particularly during start up. Accordingly, the vehicle may be an autonomous vehicle. Autonomous vehicles use a variety of sensors and computing devices to navigate the vehicle to a destination with various levels of input from a human driver. The Society of Automotive Engineers (SAE) has defined multiple levels of autonomous vehicle operation. At levels 0-2, the human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes.

At level 5 ("full automation"), the vehicle can handle almost all tasks without any driver intervention.

Figure 1B:
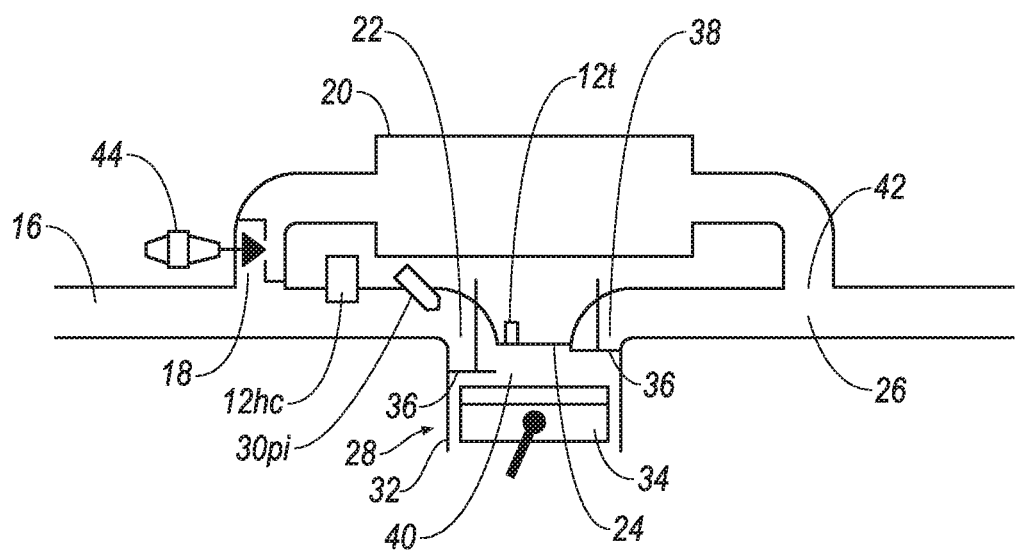
FIG. 1B is a schematic of an example port injected engine with an exhaust gas recirculation system.

FIGS. 1A and 1B illustrate an engine 28 in fluid communication with an engine air intake 16 and an engine exhaust 26. Fuel is provided to the engine 28 via a fuel injector 30. The engine 28 shown in FIG. 1*a* is a direct injected engine. The engine 28 shown in FIG. 1*b* is a port injected engine.

The engine 28 includes a cylinder body 32, a piston 34, a plurality of engine valves 36, a cylinder head 24, the intake port 22, and an exhaust port 38. A temperature sensor 12*t* may be mounted to the cylinder head 24 to detect a temperature of the cylinder head 24, as described further below.

The cylinder body 32 includes a combustion chamber 40. One end of the combustion chamber 40 is enclosed by the piston 34, and an opposite end of the combustion chamber 40 is enclosed by the cylinder head 24. The piston 34 may slide within the cylinder body 32, thereby changing a size of the combustion chamber 40.

The engine air intake 16 directs air to the intake port 22. The engine exhaust 26 directs exhaust gases away from the exhaust port 38. The intake port 22 and exhaust port 38 provide fluid communication between the engine air intake 16 and the engine exhaust 26, respectively, for an ingress and an egress of gases into, and out of, the combustion chamber 40, respectively. The engine valves 36 open and closes to permit and inhibit, respectively, the flow of fluid through the intake port 22 and the exhaust port 38, for example based on a rotational positon of a cam shaft.

The injector 30 provides fuel for combustion within the combustion chamber 40. The injector 30 may provide fuel to upstream of the combustion chamber 40, e.g., to the engine air intake 16, or directly to the combustion chamber 40. For example, in a direct injected configuration, an injector 30*di* is mounted on the cylinder head 24 and positioned to inject fuel in the combustion chamber 40 and onto the piston 34 (FIG. 1 A). In a port injected configuration, an injector 30*pi* is mounted along the engine air intake and positioned to inject fuel in the engine air intake 16 and onto the engine valve 36 that opens and closes the intake port 22 (FIG. 1B).

The exhaust gas recirculation system 20 is fluidly connected the engine exhaust 26 and to the engine air intake 16, permitting the recirculation of exhaust gases exiting the exhaust port 38 back into the intake port 22. Such exhaust gas recirculation may reduce nitrogen oxide (NOx) emissions.

The exhaust gas recirculation system 20 includes an intake port 42, the exhaust port 18, and a fluid passage (not numbered) extending from the intake port 42 to the exhaust port. The recirculated exhaust gases enter the exhaust gas recirculation system 20 through the intake port 42, and exits the exhaust gas recirculation system 20 through the exhaust port 18. Specifically, the intake port 42 of the exhaust gas recirculation system 20 provides communication between the engine exhaust 26 and the exhaust gas recirculation system 20, permitting exhaust gases to flow from the engine exhaust 26 to the exhaust gas recirculation system 20. The exhaust port 18 of the exhaust gas recirculation system 20 provides communication between the engine air intake 16 and the exhaust gas recirculation system 20, permitting exhaust gases to flow from the exhaust gas recirculation system 20 to the engine air intake 16.

The exhaust gas recirculation system 20 is moveable between the open state and a closed state. In the open state, gases are permitted to flow through the exhaust gas recirculation system 20, i.e., into the intake port 42 and out of the exhaust port 18. In the closed state, gases are prevented from flowing through the exhaust gas recirculation system 20.

The exhaust gas recirculating system 20 includes a valve 44. The valve 44 actuates between open and closed positions. For example, the valve 44 may be actuated in response to a command from the computer 14. The valve, for example, may be a solenoid.

The valve 44 is mounted along the fluid passage of the exhaust gas recirculation system 20 between the intake port 42 and the exhaust port 18. When in the open position, the valve 44 places the gas recirculation system 20 in the open state to allow fluid flow through the exhaust gas recirculation system 20. When in the closed position, the valve 44 places the gas recirculation system 20 in in the closed state.

The hydrocarbon sensor 12*hc* is mounted along the engine air intake 16 between the exhaust port 18 of exhaust gas recirculation system 20 and the intake port 22 of the cylinder head 24. In such positon, the hydrocarbon sensor 12*hc* may detect hydrocarbons introduced to the engine air intake 16 from the exhaust gas recirculation system 20 and from an outside environment, e.g., ambient air.

Figure 2:
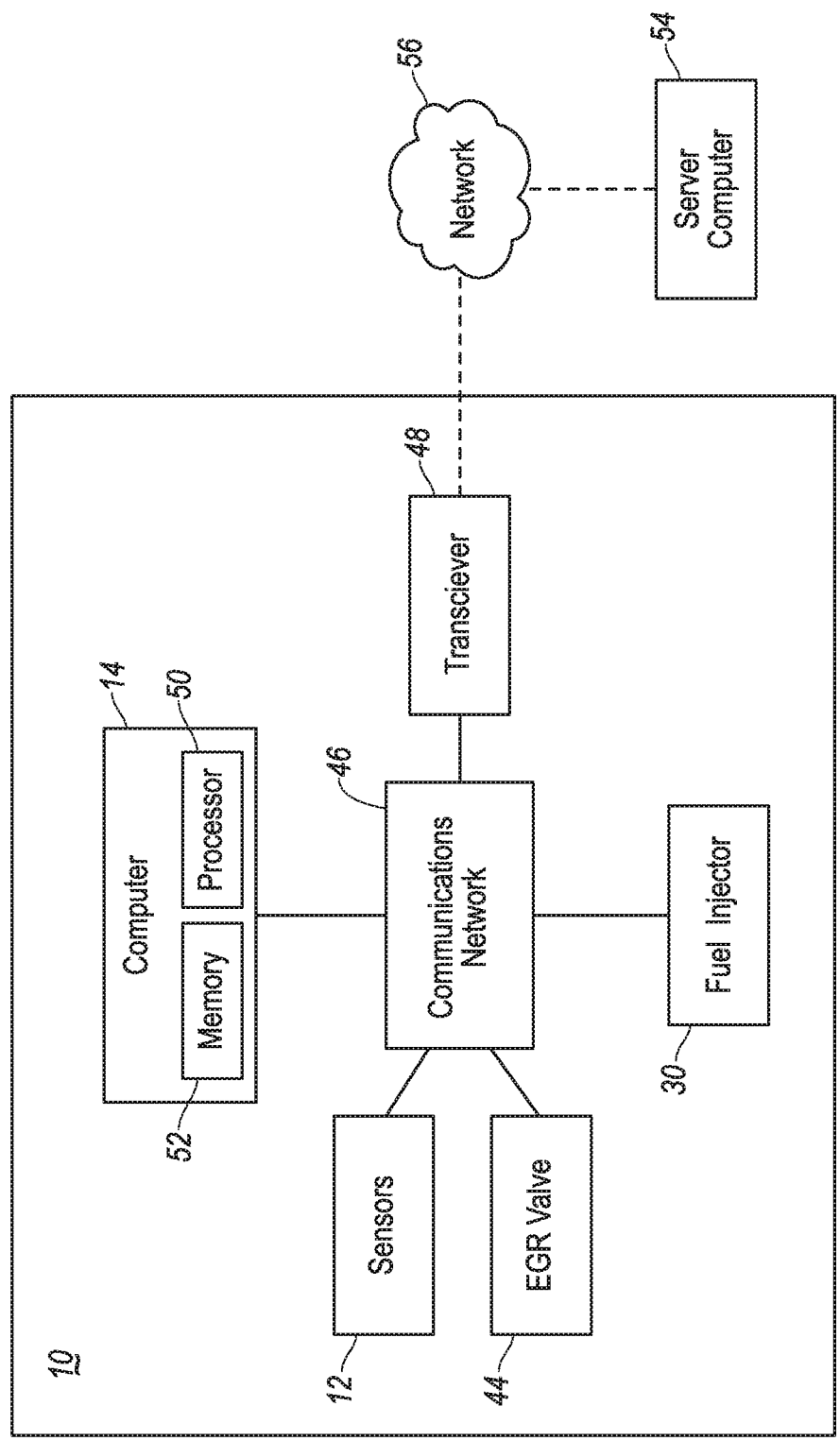
FIG. 2 is a block diagram of a hydrocarbon sensor diagnostic system.

With reference to FIG. 2, a block diagram of electrical components of the system 10 is shown. The system 10 includes sensors 12, the computer 14, the fuel injector 30, the exhaust gas recirculation valve 44, a vehicle communication network 46, and a transceiver 48.

The sensors 12 may detect internal states of the vehicle, for example, engine, air intake, and exhaust variables. For example, the hydrocarbon sensor 12*hc* may detect the presence of hydrocarbons, e.g., in various intake and exhaust engine manifolds. As another example, temperature sensors may detect various engine component temperatures, e.g., the temperature sensor 12*t* may detect the temperature of the cylinder head 24. The sensors 12 may detect conditions in the environment external to the engine 28 and/or the vehicle, for example, temperature sensors, e.g., to detect ambient air temperature.

The communication network 46 includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The transceiver 48 transmits and receives information wirelessly from other transceivers, enabling signals, data and other information to be exchanged with other computer and network systems. The transceiver is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers.

The computer 14 includes a processor 50 and a memory 52. The computer 14 is in electronic communication with, e.g., via the communications network 46, one or more input devices for providing data to the computer 14 and one or more output devices for receiving data and/or instructions from the computer 14, e.g., to actuate the output device. Example input devices include: sensors 12, the transceiver 48, etc., as well as other sensors and/or electronic control units (ECUs) that provide data to the computer 14. Example output devices that may be actuated by the computer 14 include: the fuel injector 30, the exhaust gas recirculation valve 44, the transceiver 48, as well as other devices that may be actuated by the computer 14 such as a starter motor, fuel pump, spark plugs, etc. Although one vehicle computer 14 is shown in FIG. 2 for ease of illustration, the computer 14 may include, and various operations described herein may be carried out by, one or more computing devices.

The processor 50 is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data from the sensors and determine, from the data, whether a fault exists with the hydrocarbon sensor 12hc. The processor may be programmed to process the sensor data. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors, a sensor rationalization database, and programming for performing the various processes, commands, determinations, etc., discussed herein.

The sensor rationalization database includes expected sensor 12 outputs, e.g., output of the hydrocarbon sensor 12hc, based on other associated variables that may affect the output of such sensor 12, e.g., cylinder head 24 temperature, ambient temperature, time elapsed since starting the engine 28, state of the exhaust gas recirculation system 20, etc. For example, the sensor rationalization database may correlate various expected hydrocarbon senor outputs, e.g., 200 parts per million (ppm), with a value one of more of the other variables, e.g., 40 degrees Fahrenheit cylinder head temperature with the exhaust gas recirculation system 20 in the closed state.

The computer 14 may be programmed to actuate the fuel injector 30. For example, the computer 14 may transmit a command via the communications network 46 instructing actuation of the fuel injector 30. The fuel injector 30 may be actuated as part of a startup procedure, during engine operation, etc.

The computer 14 may be programmed to actuate the exhaust gas recirculation system 20 valve 44 to the open and closed positions. For example, the computer 14 may transmit a command via the communications network 46 to the valve 44 instructing the valve 44 to actuate to the open position or to the closed position. The computer may transmit the command to actuate the exhaust gas recirculation valve 44 to the open position upon starting the engine 28 mounted to the engine air intake 16. For example, the computer 14 may transmit the command to actuate the valve 44 simultaneously with starting the engine 28, or may transmit the command within a time interval, e.g., 2 seconds or 20 seconds, of starting the engine 28.

The computer 14 may be programmed to start the engine 28. For example, the computer may be programmed to transmit commands to actuate various vehicle components, such as a fuel pump, starter motor, fuel injectors 30, spark plugs, etc., to spin a crank shaft of the engine 28, and maintain the spinning of the crankshaft with combustion of fuel within combustion chambers of the engine 28. The computer may identify a time of starting the engine 28, e.g., by storing a time of initiating the command transmission to start the engine 28, or a time at which the engine 28 is running with combustion, i.e., when the starter motor is not required to maintain spinning of the crankshaft. The identified start time may be stored on the memory 52.

The computer 14 may be programmed to collect data from the hydrocarbon sensor 12hc. For example, the computer 14 may receive data from the hydrocarbon sensor 12hc via the communications network 46. The computer 14 may store the received data, e.g., on the memory 52. The stored data may include associated information, such as a time of data collection and engine variables, e.g., the state of the state exhaust gas recirculation system, the temperature of the cylinder head 24, the ambient air temperature, etc.

The data may be collected while the exhaust gas recirculation system 20 is in the open state, e.g., the computer 14 may actuate the exhaust gas recirculation valve 44 to the open position before, or while, data from the hydrocarbon sensor 12hc is being collected.

The data may be collected within a predetermined time of starting the engine 28. For example, the data may be collected within two seconds of starting the engine 28. For example, the computer 14 may begin collecting data within two seconds of the engine starting time stored on the memory 52, discussed above. As another example, the data may be collected within twenty seconds of starting the engine 28.

The data may be collected while actuating the fuel injector 30 before starting the engine 28. For example, the computer 14 may collect the data from the hydrocarbon sensor 12hc simultaneously with actuating the fuel injector 30, and for an amount of time, e.g., 0.5 seconds, before and after actuating the fuel injector 30. The computer 14 may instruct actuation of the fuel injector 30, and the related data collection, before transmitting other commands for staring the engine 28, e.g., before instructing actuation of the starter motor.

The computer 14 may be programmed to determine whether an increase in hydrocarbons was detected by the hydrocarbon sensor 12hc. For example, the computer 14 may compare the stored output of the hydrocarbon sensor 12 associated with a time interval before actuating the fuel injector 30, e.g., the 0.5 seconds immediately preceding such actuation, with the stored output of the hydrocarbon sensor 12 associated with a time interval after actuating the fuel injector 30, e.g., the 0.5 seconds immediately following such actuation. The comparison may include a difference calculation, e.g., an after output of 150 ppm minus a before output of 100 ppm yielding a difference of 50 ppm. The increase may be identified when the different between the before and after outputs is above threshold, e.g., 30 ppm.

The computer 14 may be programmed to determine whether a hydrocarbon sensor fault exists based at least on the collected data from the hydrocarbon sensor 12. For example, the computer 14 may compare the output of the hydrocarbon sensor 12 with the expected output of the sensor indicated in the sensor rationalization database. The expected output in the database for comparison may be selected based on the value of other variables associated with various expected outputs.

As one example, the determination of whether the hydrocarbon sensor fault exists may be based at least on the ambient air temperature, e.g., the measured ambient air temperature may be used as the associated variable with the database to look up and identify the expected sensor output. As another example, the determination of whether the hydrocarbon sensor fault exists may be based at least on the temperature of the cylinder head 24, e.g., the cylinder head 24 temperature may be used as the associated variable with the database to look up and identify the expected sensor output. Similarly, the other associated variables, e.g., those in the sensor rationalization database, singularly and in combination, may be used to identify expected sensor outputs for comparison.

Based on the comparison the computer 14 may determine whether the hydrocarbon sensor fault exists. For example, the comparison between the expected sensor output and the actual sensor output may be used to determine if the actual sensor output is rational, i.e., whether a variation between the expected sensor output and the actual sensor output is at or below a threshold, e.g., 5%. The hydrocarbon sensor fault may be determined to exist when the variation is above the threshold. Conversely, no hydrocarbon sensor fault may be determined to exist when the variation is at or below the threshold.

The computer 14 may be programmed to store a fault code, e.g., a code indicating a fault exists with the hydrocarbon sensor 12, in response to determining that the hydrocarbon sensor fault exists. For example, the computer 14 may store the fault code, e.g., in the memory 52, upon determination that the variation between the expected sensor results and the actual sensor results are above the threshold. The fault code may include the actual output of the hydrocarbon sensor 12$hc$, the expected sensor output, and the associated variables used to select the expected sensor results.

The computer 14 may be programmed to transmit the fault code in response to determining that the hydrocarbon sensor fault exists. For example, computer 14 may transmit the fault code by commanding the transceiver 48 to perform such transmission. The fault code may be transmitted to a server computer 54, e.g., via a network 56. The transmission of the fault code may include an intended address for receipt of the transmission, e.g., an email address, an internet protocol address, etc.

The computer 14 may be programmed to store and/or to transmit a no fault code, e.g., a code indicating that no fault with the hydrocarbon sensor 12 exists, in response to determining that no hydrocarbon sensor fault exists, e.g., upon determination that the variation between the expected sensor results and the actual sensor results is at or below the threshold. Storing and/or transmitting the no fault code may be performed by the computer 14 as described above for the fault code. The transmission of the no fault code may include an intended address for receipt of the transmission, e.g., an email address, an internet protocol address, etc.

The server computer 54 is a computing device that includes hardware, e.g., circuits, chips, antenna, etc., programmed to transmit, receive, and process information from the vehicle computer 14, e.g., via the network 56. The server computer 54 includes a processor and a memory implemented in a manner as described above for the processor 50 and memory 52. For example, the server computer 54 may be programmed to receive and store the fault code, and/or the no fault code. The server computer 54 may be associated with a governmental regulatory agency, a vehicle manufacturer or service facility, etc. The server computer 54 may use any suitable technologies, including those discussed herein.

The network 56 represents one or more mechanisms by which the vehicle computer 14 may communicate with remote devices, e.g., the server computer 54. Accordingly, the network 56 may include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

Figure 3:
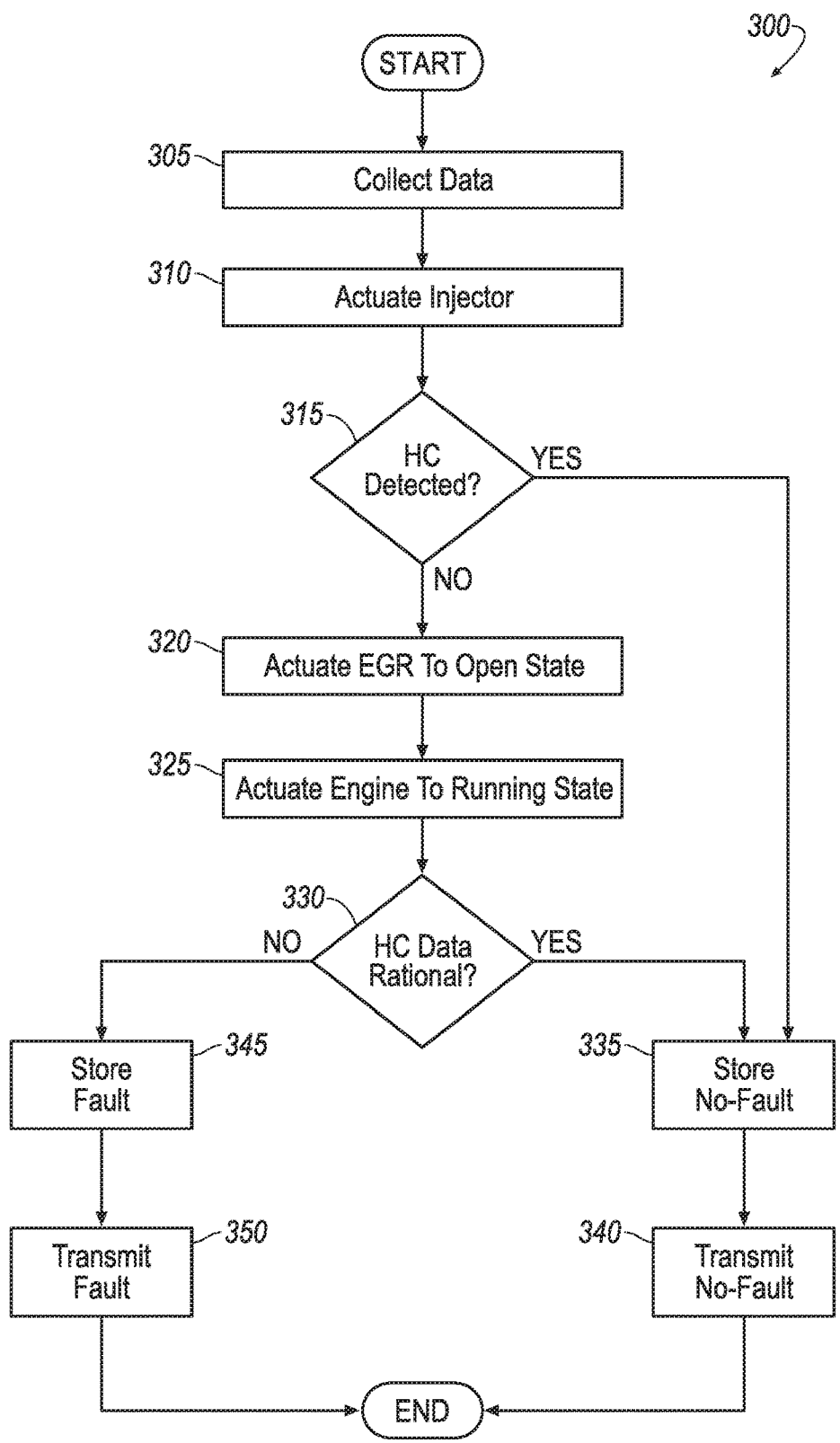
FIG. 3 is a flow chart of an example process for performing a hydrocarbon sensor diagnostic.

With reference to FIG. 3, a process flow diagram illustrating an exemplary process 300 for performing a hydrocarbon sensor diagnostic is shown. The process 300 begins in a block 305. The process may begin when the vehicle is turned on, e.g., as a part of an engine start process.

At the block 305 the computer 14 collects the data from the hydrocarbon sensor 12$hc$. The computer 14 may collect the data throughout the process 300, or may collect the data during discrete time intervals, e.g., while the exhaust gas recirculation system 20 is in the open state, within two seconds of starting the engine 28, within twenty seconds of starting the engine, and/or while actuating the fuel injector 30.

At a block 310 the computer 14 actuates the fuel injector 30, e.g., as described above.

At a block 315 the computer 14 determines if the hydrocarbon sensor 12$hc$ detected an increase in hydrocarbons. For example, the output of the hydrocarbon sensor 12 before actuation of the fuel injector may be compared to the output of the hydrocarbon sensor after actuation of the fuel injector 30. When the comparison indicates the after actuation output is not higher than the before actuation output the process may move to a block 320. When the comparison indicates the after actuation output is higher than the before actuation output the process may move to a block 335.

At the block 320 the computer 14 actuates the exhaust gas recirculation system 20 to the open state. For example, the computer 14 may instruction the exhaust gas recirculation valve 44 to the open position.

At a block 325 the computer 14 actuates the engine 28 to the running state. For example, the computer 14 may actuate the starter motor, fuel pump, fuel injectors 30, etc., to spin the crankshaft and to maintain such spinning via combustion of fuel.

At a block 330 the computer 14 determines whether data collected from the hydrocarbon sensor 12$hc$ is rational. For example, the computer 14 may compare the actual output with the expected output of the hydrocarbon sensor 12, e.g., by using the sensor rationalization database, as described above. When the data is rational, e.g., the variation between the expected sensor output and the actual sensor output is at or below the threshold, the process 300 moves to the block 335. When the data is not rational, e.g., the variation between the expected sensor output and the actual sensor output is above the threshold, the process 300 moves to a block 345.

At the block 335 the computer 14 stores the no fault code, as described above. At a block 340 the computer 14 transmits the no fault code, as described above. At the block 345 the computer 14 stores the fault code, as described above. At a block 350 the computer 14 transmits the fault code, as described above. After the block 350, the process 300 ends.

Computing devices generally include computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer programmed to:
   before starting an engine mounted to an engine air intake, collect data from a hydrocarbon sensor mounted along the engine air intake between an exhaust port of an exhaust gas recirculation system and an intake port of a cylinder head while the exhaust gas recirculation system is in an open state and while actuating a fuel injector mounted on the engine air intake; and
   determine whether a hydrocarbon sensor fault exists based at least on the collected data.

2. The system of claim 1, the computer further programmed to collect the data from the hydrocarbon sensor within a predetermined time of starting an engine mounted to the engine air intake.

3. The system of claim 1, the computer further programmed to collect the data from the hydrocarbon sensor within twenty seconds of starting an engine mounted to the engine air intake.

4. The system of claim 1, wherein the determination of whether the hydrocarbon sensor fault exists is based at least on an ambient air temperature.

5. The system of claim 1, wherein the determination of whether the hydrocarbon sensor fault exists is based at least on a temperature of the cylinder head.

6. The system of claim 1, the computer further programmed to actuate an exhaust gas recirculation valve to an open position upon starting an engine mounted to the engine air intake.

7. The system of claim 1, the computer further programmed to store a fault code in response to determining that the hydrocarbon sensor fault exists.

8. The system of claim 1, the computer further programmed to transmit a no fault code in response to determining that no hydrocarbon sensor fault exists.

9. The system of claim 1, the computer further programmed to transmit a fault code in response to determining that the hydrocarbon sensor fault exists.

10. A method comprising:
    before starting an engine mounted to an engine air intake, collecting data from a hydrocarbon sensor mounted along the engine air intake between an exhaust port of an exhaust gas recirculation system and an intake port of a cylinder head while the exhaust gas recirculation system is in an open state and while actuating a fuel injector mounted on the engine air intake: and
    determining whether a hydrocarbon sensor fault exists based at least on the collected data.

11. The method of claim 10, further comprising collecting the data from the hydrocarbon sensor within a predetermined time of starting an engine mounted to the engine air intake.

12. The method of claim 10, comprising collecting the data from the hydrocarbon sensor within twenty seconds of starting an engine mounted to the engine air intake.

13. The method of claim 10, wherein the determination is based at least on an ambient air temperature.

14. The method of claim 10, wherein the determination is based at least on a temperature of the cylinder head.

15. The method of claim 10, further comprising actuating an exhaust gas recirculation valve to an open position upon starting an engine mounted to the engine air intake.

16. The method of claim 10, further comprising storing a fault code in response to determining that the hydrocarbon sensor fault exists.

17. The method of claim 10, further comprising transmitting a no fault code in response to determining that no hydrocarbon sensor fault exists.

18. The method of claim 10, further comprising transmitting a fault code in response to determining that the hydrocarbon sensor fault exists.

19. A system, comprising a computer programmed to:
  collect data from a hydrocarbon sensor mounted along an engine air intake between an exhaust port of an exhaust gas recirculation system and an intake port of a cylinder head while the exhaust gas recirculation system is in an open state; and
  determine whether a hydrocarbon sensor fault exists based at least on the collected data and based on at least one of an ambient air temperature and a temperature of the cylinder head.

* * * * *

UNITED STATES PATENT AND TRADEMARK OFFICE
CERTIFICATE OF CORRECTION

PATENT NO.         : 10,378,472 B2                                  Page 1 of 1
APPLICATION NO.    : 15/435741
DATED              : August 13, 2019
INVENTOR(S)        : Aed M. Dudar et al.

It is certified that error appears in the above-identified patent and that said Letters Patent is hereby corrected as shown below:

In the Claims

Column 10, Line 54, Claim 10: delete the ":" and replace with --;--.

Signed and Sealed this
Nineteenth Day of November, 2019

Andrei Iancu
*Director of the United States Patent and Trademark Office*